(12) United States Patent
Usova

(10) Patent No.: US 9,382,468 B2
(45) Date of Patent: Jul. 5, 2016

(54) HYDRAULIC FRACTURING PROPPANT CONTAINING INORGANIC FIBERS

(75) Inventor: Zinaida Yurievna Usova, Tomsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 515 days.

(21) Appl. No.: 13/514,592

(22) PCT Filed: Dec. 30, 2009

(86) PCT No.: PCT/RU2009/000749
§ 371 (c)(1),
(2), (4) Date: Jul. 1, 2012

(87) PCT Pub. No.: WO2011/081545
PCT Pub. Date: Jul. 7, 2011

(65) Prior Publication Data
US 2012/0277130 A1    Nov. 1, 2012

(51) Int. Cl.
*C09K 8/74* (2006.01)
*C09K 8/80* (2006.01)
*C04B 33/04* (2006.01)
*C04B 33/36* (2006.01)
*C04B 35/117* (2006.01)
*C04B 35/18* (2006.01)
*C04B 35/185* (2006.01)
*C04B 35/626* (2006.01)
*C04B 35/80* (2006.01)
*C04B 35/82* (2006.01)

(52) U.S. Cl.
CPC . *C09K 8/80* (2013.01); *C04B 33/04* (2013.01); *C04B 33/36* (2013.01); *C04B 35/117* (2013.01); *C04B 35/18* (2013.01); *C04B 35/185* (2013.01); *C04B 35/62695* (2013.01); *C04B 35/803* (2013.01); *C04B 35/82* (2013.01); *C09K 8/805* (2013.01); *C04B 2235/321* (2013.01); *C04B 2235/3206* (2013.01); *C04B 2235/3217* (2013.01); *C04B 2235/3272* (2013.01); *C04B 2235/349* (2013.01); *C04B 2235/3436* (2013.01); *C04B 2235/3445* (2013.01); *C04B 2235/3454* (2013.01); *C04B 2235/3463* (2013.01); *C04B 2235/3472* (2013.01); *C04B 2235/3481* (2013.01); *C04B 2235/3826* (2013.01); *C04B 2235/3873* (2013.01); *C04B 2235/5224* (2013.01); *C04B 2235/5228* (2013.01); *C04B 2235/5296* (2013.01); *C04B 2235/5427* (2013.01); *C04B 2235/5436* (2013.01); *C04B 2235/80* (2013.01); *C04B 2235/96* (2013.01); *C09K 2208/08* (2013.01)

(58) Field of Classification Search
CPC ............................ C09K 8/80; Y10S 507/924
USPC ....................................................... 507/269
See application file for complete search history.

(56) References Cited

U.S. PATENT DOCUMENTS

| 5,120,455 | A | 6/1992 | Lunghofer |
| 6,037,288 | A * | 3/2000 | Robinson ................ C04B 33/36 501/143 |
| 6,753,299 | B2 | 6/2004 | Lunghofer et al. |
| 2006/0081371 | A1* | 4/2006 | Duenckel et al. .......... 166/280.2 |
| 2007/0246214 | A1 | 10/2007 | Fish et al. |
| 2008/0009425 | A1 | 1/2008 | Pershikova |
| 2010/0071901 | A1* | 3/2010 | Luo et al. .................... 166/280.2 |
| 2011/0111990 | A1* | 5/2011 | Pershikova et al. ........... 507/219 |

FOREIGN PATENT DOCUMENTS

| RU | 2091304 | 9/1997 |
| RU | 2140875 | 11/1999 |
| RU | 2140875 C1 | 11/1999 |
| WO | 2007109281 A2 | 9/2007 |
| WO | WO 2009134159 A1 * | 11/2009 |

OTHER PUBLICATIONS

Examiner's Report with translation issued in CN 200980163222.2 on Feb. 8, 2014, 14 pages.
Kim, B.H., et al., "Recycling of glass waste and shells by the fabrication of glass-ceramics reinforced by a whisker-type wollastonite phase", Journal of Ceramic Processing Research 5 (2), pp. 140-142, 2004.

* cited by examiner

Primary Examiner — Aiqun Li

(57) ABSTRACT

This invention is related to the oil and gas production industry and more particularly to a proppant that can be used to enhance oil and gas production in hydraulic fracturing. Most particularly, the invention is a composition and a manufacturing process for making ceramic proppant: a ceramic matrix composition formed from a precursor of the matrix and a reinforcing additive, in which the reinforcing additive is in the form of numerous elongated inorganic crystals; or one or more than one precursor may be pre-fired (pre-calcined).

14 Claims, No Drawings

HYDRAULIC FRACTURING PROPPANT CONTAINING INORGANIC FIBERS

BACKGROUND OF THE INVENTION

This invention is related to the oil and gas production industry and more particularly to a proppant that can be used to enhance oil and gas production in hydraulic fracturing. Most particularly, the invention is a composition and a manufacturing process for making ceramic proppants.

There is a need for inexpensive high strength proppants.

SUMMARY OF THE INVENTION

It is an object of the present invention to provide low-cost proppants for hydraulic fracturing and methods for producing them.

One embodiment is a ceramic matrix composition formed from a precursor of the matrix and a reinforcing additive, in which the reinforcing additive is in the form of numerous elongated inorganic crystals. The composition may be in the form of a granular material. The reinforcing additive may include one or more than one of natural wollastonite, wollastonite concentrate, synthetic wollastonite, beta-wollastonite, enstatite, dolomite, magnesia, magnesium silicates, forsterite, steatite, olivines, silicon carbide, silicon nitride, inorganic fibers, fibers produced from slugs, commercially available inorganic crystalline fibers, alpha-alumina based fibers, alumina-silica based fibers, glass fibers, and fibers. The amount of reinforcing additive typically does not exceed 25 weight percent. The precursor of the matrix includes one or more than one of clays, kaolins, bauxites, kaolinites, alumina fines, aluminum hydroxides, powders of aluminum oxides, mica, aluminum silicates, mullite, kyanite, and sillimanite, and mixtures of these materials. The alumina content of the bauxite or bauxites is typically in the range of from about 50 to about 75 weight percent. The reinforcing additive preferably includes wollastonite, wollastonite concentrate, or synthetic wollastonite crystals having a length to diameter ratio in the range of from about 3 to about 40, more preferably from about 8 to about 20.

In other embodiments of the composition, one or more than one precursor may be pre-fired (pre-calcined). The reinforcing additive may be added to the precursor of the matrix, a precursor of the reinforcing additive may be added to the precursor of the matrix, or both a reinforcing additive and a precursor of a reinforcing additive may be added to the precursor of the matrix. The composition is typically fired at a temperature below about 1500° C. and below the melting temperature of the reinforcing additive, for example at a temperature between about 1200 and about 1350° C.

Yet another embodiment of the invention is a method of preparing a proppant material that contains a ceramic matrix and a reinforcing agent. The method includes the steps of crushing the raw components, mixing the raw components, granulating the mixture into proppant granules, drying the granules, sintering the granules, and sieving the granules to provide selected sizes. In this method the raw components may include one or more ceramic matrix precursor materials and one or more than one reinforcing additive, or one or more ceramic matrix precursor materials and one or more than one precursor of a reinforcing additive, or one or more ceramic matrix precursor materials and one or more than one reinforcing additive and one or more than one precursor of a reinforcing additive.

DETAILED DESCRIPTION OF THE INVENTION

Although the following discussion emphasizes fracturing, the reinforced proppants and methods of the Invention may be used in fracturing, gravel packing, and combined fracturing and gravel packing in a single operation. The invention may be described in terms of treatment of vertical wells, but is equally applicable to wells of any orientation. The invention may be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Described here is a composition for making ceramic pellets, commonly referred to as proppants, as well as the manufacturing process thereof. The unique composition of the proppant results in a significant increase in strength while minimizing the proppant specific gravity. The beneficial result is a high strength proppant with improved transport properties, compared to conventional proppants, owing to a low specific gravity for the strength. These proppants are particularly useful at pressures above about 68.95 MPa (about 10,000 psi).

The proppant is manufactured from a combination of a ceramic matrix, made with readily available and inexpensive bauxite having an intermediate aluminum content, and an inorganic reinforcing additive, for example in the form of inorganic elongated crystals (for example needle shaped crystals, fibers, plate-like shapes and whiskers). An example is the mineral example Wollastonite. A reinforcing network is formed in the ceramic granule, thereby increasing its strength. The reinforcing additive or phase can be added to the raw materials blend or can be formed in-situ during the manufacturing process. As a result, a material having approximately the density of the initial inorganic matrix is formed. Preferably up to about 15 weight percent of the reinforcing additive is used. This composition and method has been designed to work with the inexpensive and relatively lightweight bauxite typically used for intermediate strength proppants (for example having an alumina content of from about 50 to about 75 weight percent).

Such an approach has been used quite extensively in materials science in composites made primarily from metals and polymers, as well as made from ceramic matrices. However, the use in the present invention of inorganic fibers to toughen ceramic matrices is very different from that of fibers used in a metal or polymer matrix. This difference arises from the nature of the matrix materials used. Polymer (such as resin) and most metal composites typically take advantage of the lower rigidity and the ability of the matrix material to deform plastically. This, together with the greater rigidity of the reinforcements, allows stresses to be transformed to the fibers through the matrix and their extraordinary mechanical properties to be conferred to the composite structure as a whole. In contrast, in the present invention the ceramic matrix composites are composed of a very stiff (brittle) matrix, in which less-stiff fibers are embedded. In this way the roles are reversed to some extent compared to the traditional composite. The stiffness of the whole composite is primarily governed by the matrix. The role of the fibers is to militate against the brittleness of the matrix. The fibers must stop cracks from propagating in the ceramic matrix. Several factors contribute: the strength of the bond at the fiber-matrix interface, the bridging of cracks by fibers, and their resistance to subsequent pullout. The fibers reduce both crack lengthening and crack widening. In both of these cases the interfacial bond is of primary importance.

An advantage of the current invention is that the proppant of the invention can be manufactured using conventional proppant manufacturing materials and processes. Normally, proppants for high-stress applications (called high strength proppant) are produced using high quality grade bauxite (for example having an alumina content above about 75 weight percent) and are synthesized at high temperatures (for example above about 1400° C.) which both lead to the high cost of the final product. The manufacturing cost of the composite reinforced proppant of the invention is lower than that of conventional high strength proppants due to the lower firing temperature and the lower cost of intermediate strength bauxite, a main ingredient.

The higher strength of the proppant of the invention prevents the crushing of this proppant under elevated closure stresses, resulting in a highly conductive proppant pack which can lead to increased oil and gas production. The lower density of this material, relative to other proppants of similar strength, will help to ensure improved proppant transport and placement within the fracture. Lower density proppants have lower settling rates in a given fluid and so can be pumped in a lower viscosity fluid, at lower pump rates, or deeper into a fracture, depending upon the needs of the operator.

U.S. Pat. No. 6,753,299 teaches a lightweight, permeable, proppant composition which preferably includes equal amounts by weight of unfired (uncalcined) bauxite, unfired shale and quartz, held together by a binder formed of wollastonite and talc in an amount of less than 10% by weight of the composition. The proppant is fired at from 1100 to 1200° C. The overall content of alumina in this composition is less than 25 weight percent, the silica content is above 45 weight percent, and the wollastonite is used only with talc, to produce additional crystalline phases in the proppant body. The preferred proppant contains 45 percent or more by weight of quartz, which is the primary crystalline phase. The addition of talc and wollastonite is said by the inventors to result in the formation of a magnesium iron silicate (spinel) and an anorthite feldspar phase respectively. Minor amounts of feldspar may be found in the proppants of the present invention, but it is not a desired phase. The proppant of the cited reference is said to be highly permeable and porous; the proppant of the present invention is believed to have a porosity about the same as for conventional ceramics proppants, namely less than about 30 weight percent.

U.S. Pat. No. 5,120,455 discloses a proppant having an alumina content of 40 to 60 weight percent, a silica content of 36.5 to 56.5 weight percent and up to 5 weight percent of a crush strength enhancer selected from nepheline syenite, fused bauxite dust, wollastonite, talc, and feldspar. The crush strength enhancer is said by the inventor to act by impeding cristobalite formation during sintering. They do not mention that the crush strength enhancer must have a certain length to diameter ratio and they do not specify that the composition must be fired at a temperature below the melting point of the crush enhancer.

The mineral wollastonite ($CaO.SiO_2$) has been synthesized within the forming matrix in the production of ceramics and glass-ceramics. For example, glass-ceramics, showing high mechanical strength, reinforced by whisker-type wollastonite crystals, have been prepared by a milling and heat-treatment process using mixtures of various glass wastes and shells as starting materials. Formation of whisker-type β-wollastonite crystals was observed in the glass matrix using X-ray diffraction analysis. On increasing the annealing temperature from 800° C. to 900° C. to 1000° C., the compressive strength of the specimens increased. However, in the present invention the whisker-type wollastonite (or similar material) is preferentially added in ready form into the precursor mixture.

The reinforced hydraulic fracturing proppant comprising a plurality of sintered, spherical pellets, are prepared from a composition comprising at least one component from group A (forming the matrix) and at least one component from group B (the reinforcing component):

Group A (Matrix):
Bauxites, kaolins, kaolinites, clays, alumina fines, aluminum hydroxides, powders of aluminum oxides (in transition states), mica, aluminum silicates (for example mullite, kyanite, and sillimanite), and bauxite (a naturally occurring, heterogeneous material composed primarily of one or more aluminum hydroxide materials, plus various mixtures of silica ($SiO_2$), iron oxide ($Fe_2O_3$), titania ($TiO_2$), aluminosilicates and other impurities in trace amount) and mixtures of these materials.

Group B (Reinforcing Component):
Natural wollastonite, wollastonite concentrate (a concentrate refined to have a low impurities content and a selected length to diameter ratio), synthetic wollastonite, beta-wollastonite, enstatite, dolomite, magnesia, magnesium silicates (forsterite, steatite), olivine (solid solutions of magnesium and ferrous silicates), silicon carbide, silicon nitride, inorganic fibers, fibers produced from the slugs byproduct of metal production, alpha-alumina based fibers, alumina-silica based fibers, glass fibers, refractory ceramic fibers that are resistant to the proppant sintering temperature, and mixtures of these materials. The primary requirement for any natural or synthetic reinforcing material are a preferred length to diameter ratio of about 3 to about 40, most preferably from about 8 to about 20, an preferred impurities content of less than about 10 weight percent, and a preferred fiber diameter less than about 80 to 100 µm. Many commercially available members of group B have properties outside these ranges.

A combination of material from groups A and B allows obtaining composite materials having a bauxite or alumina-silicate matrix reinforced by a phase of inorganic whiskers, needles, fibers and other elongated inorganic crystals. The reinforcing component is preferably added at a concentration of up to about 10 weight percent. The components of groups A and B are mixed at concentrations such that the alumina content of the final product is from about 60 to about 90 weight percent, preferably from about 70 to about 78 weight percent, and the silica content is from about 5 to about 30 weight percent, preferably from about 15 to about 20 weight percent.

Continuous fiber reinforcement provides both strength and toughness. The fibers are usually stronger and have higher Young Modulus values than the matrix materials, and they support most of the applied load. The failure mechanism for fiber-reinforced ceramic and conventional ceramic is different, in that it is not catastrophic for fiber-reinforced ceramics, because a large fraction of the applied load can continue to be supported by the fibers even after the matrix has cracked.

Application of a composite approach allows for the production of proppant with a specific gravity close to that of the basic matrix (e.g. intermediate strength bauxite) but greater crush strength, because the reinforcing material is added at a relatively low concentration and has a density similar to that of the matrix components.

The inorganic fiber reinforced proppant material is prepared using conventional proppant manufacturing technology. At least one component from group A is mixed with at least one component from group B. Optionally, more than 5 weight percent of a binding agent can be introduced. Non-limiting examples of binding agents include starch and hydroxypropyl cellulose. The binding agent is added at a concentration of from about 5 to about 7 weight percent, preferably about 3 to about 5 weight percent.

The mixture is dried at a temperature up to about 100° C., preferably at about 80 to about 95° C. Firing is performed at final temperatures of up to about 1500° C., preferably in the temperature range of about 1200 to 1350° C. (for example in commercial rotary kilns) with heating rates and residence times at the intermediate and final temperatures selected to obtain the phase composition providing the best properties of the ceramic body and to sustain the crystalline form of the reinforcing additive unchanged. The heating temperature may be increased constantly, or the heating may be stopped and the mixture held at an intermediate temperature or temperatures for a selected time or times. The firing temperatures used are selected to be below the melting point, or any phase transition point, of the component from group B. Many of the members of group B are commercially available in a variety of melting points and this must be taken into account when firing.

After cooling, the proppant is sieved to various sizes. Optionally, at least one of the polymer/metal/inorganic/composite coatings used in the oilfield (curable or pre-cured) can be applied onto the surface of the proppant by any method known to those of ordinary skill in the art. If the proppant is coated, an optional intermediate coating may be applied first to increase the strength of the adhesion of the outer coating to the proppant.

The low density makes the proppants of the invention particularly suitable for use in slick water treatments in which proppant transport is often a particularly severe problem.

It should be noted that in granulation processes it is normal to add 2 to 3 weight percent of a plasticizer such as a kaolin (if not already present) or bentonite.

The influence of the reinforcing additive was studied at various temperatures and 1450° C. was found to be the optimal temperature for the bauxite compositions studied. Firing was done in an electrical muffle furnace in the laboratory; the firing temperature may be less in a commercial rotary kiln.

The present invention can be further understood from the following examples.

Example 1

Bauxite having an alumina content of about 68 to 72 weight percent was ground to a size of about 15 microns and then mixed with 5 weight percent of natural wollastonite (having a length to diameter ratio of about 15, a Moh's Hardness of 4.5, a specific gravity of 2.9, and a melting point of 1540° C.) and 5 weight percent of kaolin; the mixture was then granulated by a dry method. In several experiments, the resulting granules were dried at about 150 to 200° C., screened into different size fractions and fired at temperatures of about 1200 to 1400° C. As a result, an alumina-silicate matrix was formed, reinforced by wollastonite needle-shaped crystals. A 20/40 mesh (420 to 840 microns) size proppant made of this composition was subjected to a crush test at 680 atm (68.95 MPa) (10,000 psi) and the fines output was below 4 weight percent.

Example 2

Bauxite having an alumina content of about 68 to 72 weight percent was pre-fired at 1200° C. and ground to a size of about 15 microns; it was then mixed with 3 weight percent natural wollastonite (particles having a length to diameter ratio of about 10) and the mixture was granulated by a dry method. The resulting granules were dried at 100° C., screened into different size fractions, and fired at a temperature of 1350° C. As a result, an alumina-silicate matrix proppant was formed, reinforced by wollastonite needle-shaped crystals. The 30/50 mesh (297 to 590 microns) size proppant made according to the invention was subjected to a crush test at 850 atm (86.18 MPa) (12,500 psi) and produced only 3 weight percent of fines.

Example 3

Bauxite having an alumina content of about 60 to 70 weight percent was ground to about 15 microns and subsequently mixed with 5 weight percent of a blend of 2 SiC and 1 MgO and the entire mixture was granulated by a wet method. The resulting granules were dried, screened into different size fractions and fired at a temperature of 1400° C. As a result, an alumina-silicate matrix proppant was created believed to contain a reinforcing phase of enstatite ($MgSiO_3$) formed during the heat-treatment. Enstatite typically has a length to diameter ratio of about 2.1, a Moh's Hardness of 5.5, a specific gravity of 3.2, and a melting point of 1540° C.

The following experiments were performed without the granulation stage; the experiments were conducted on cylindrical shaped samples (diameter=length=16 mm for green (unfired) specimens). The basic mass in each case was prepared by dry milling of bauxite with kaolin in a ball mill for at least 4 hrs with subsequent pressing through a 150 mesh (100 micron) sieve. Varying amounts of reinforcing additives were added to this basic mass. Starch was used as a binding agent by adding a 5 weight percent starch solution to the basic mass at a concentration of about 10 weight percent of the mass. The samples were formed by isostatic pressing at 30 atm. The samples were placed in a drying kiln for 2 to 3 hrs at a temperature of 60 to 70° C. (until the mass was constant). The samples were then fired in an electrical kiln at temperatures of from about 1300 to 1450° C.

Example 4

The influence of enstatite as a reinforcing additive was studied. Silicon carbide and magnetite were added in the theoretically calculated amount to form 5% of an enstatite reinforcing phase. This additive was introduced into a mixture of kaolin and a bauxite having a mullite content of 68.42% and an alumina content of 31.58% (standard Intermediate Strength Proppant (ISP) bauxite). (Mullite is an aluminosilicate material ($3Al_2O_3 \cdot 2SiO_2$) which may be formed by the high temperature interaction of silica and alumina bearing minerals.)

Table 1 shows the influence of the enstatite additive on the properties of a typical bauxite/kaolin mixture used for production of ISP's (80 weight percent of ISP-grade bauxite described above and 20 weight percent kaolin). In this case, the kaolin was used as a plasticizer. Addition of the mixture that forms 5 weight percent enstatite led to approximately doubling of the compression stress. Note that two types of ISP-grade bauxite were used for this example, one green and one pre-fired at 1200° C. for 4 hours to eliminate all free and bonded water and organic impurities. Samples of the bauxite/ kaolin mixtures were fired at 1350° C. It should also be noted that the closure pressures shown in the tables below are given for comparative reference only and show the properties of the bulk material but cannot be used as a direct value for granular proppant strength. Bidirectional loading was applied to crush the cylindrical specimens. All experiments were done in triplicate.

TABLE 1

| | Composition | | | |
|---|---|---|---|---|
| | 80% green Bauxite: 20% Kaolin | 80% green Bauxite: 20% Kaolin + 5% Enstatite | 80% pre-fired Bauxite: 20% Kaolin | 80% pre-fired Bauxite: 20% Kaolin + 5% Enstatite |
| Compressive Stress, MPa | 134 | 224 | 103 | 231 |

Example 5

In a similar series of tests the commercially available natural material wollastonite was added to the same bauxite/kaolin mixtures. Samples were fired at 1400° C. The experiments with only 1.5 weight percent of wollastonite showed significant increases in compression strength. The reinforcing effect of wollastonite was more profound on bauxite pre-fired at 1200° C. for 4 hours, leading to an increase in strength of about 60%, as shown in Table 2.

TABLE 2

| | Composition | | | |
|---|---|---|---|---|
| | 80% green Bauxite: 20% Kaolin | 80% green Bauxite: 20% Kaolin + 1.5% Wollastonite | 80% pre-fired Bauxite: 20% Kaolin | 80% pre-fired Bauxite: 20% Kaolin + 1.5% Wollastonite |
| Compressive Stress, MPa | 135 | 150 | 105 | 170 |

It has also been found that in addition to the reinforcing effect wollastonite also acts as a sintering additive so that, in combination with plain bauxite, fully sintered material can be obtained. To achieve this, a higher amount of wollastonite was used (Table 3). The samples were fired at 1400° C. The experimental data show that addition of 11 weight percent wollastonite leads to a strength increase by a factor of 3.3 and addition of 5% of the enstatite phase precursor mixture leads to a strength increase by a factor of 2.8.

TABLE 3

| | Composition | | |
|---|---|---|---|
| | 80% Bauxite 20% Kaolin | 89% Bauxite + 11% Wollastonite | 95% Bauxite 5% enstatite precursor |
| Compressive Stress, MPa | 135 | 440 | 380 |

I claim:

1. A composition comprising a ceramic matrix formed from a precursor of the matrix and a reinforcing additive, wherein the reinforcing additive is in the form of numerous elongated inorganic crystals having a length of from greater than about 0.24 mm to less than about 4 mm, wherein the reinforcing additive comprises wollastonite, wollastonite concentrate, or synthetic wollastonite crystals having a length to diameter ratio in the range of from about 3 to about 40, and wherein the ceramic matrix has an alumina content of from 60 percent to about 90 percent by weight.

2. The composition of claim 1 in the form of a granular material.

3. The composition of claim 1, wherein the amount of the reinforcing additive is in the range from greater than 5 weight percent to 25 weight percent.

4. The composition of claim 1, wherein the precursor of the matrix comprises one or more than one of clays, kaolins, bauxites, kaolinites, alumina fines, aluminum hydroxides, powders of aluminum oxides, mica, aluminum silicates, mullite, kyanite, and sillimanite, and mixtures thereof.

5. The composition of claim 4 wherein the alumina content of the bauxites is in the range of from greater than 60 to about less than 70 weight percent.

6. The composition of claim 4 wherein one or more than one precursor is pre-fired.

7. The composition of claim 1 wherein the reinforcing additive is added to the precursor of the matrix.

8. The composition of claim 1 wherein a precursor of the reinforcing additive is added to the precursor of the matrix.

9. The composition of claim 1 wherein both the reinforcing additive and a precursor of the reinforcing additive are added to the precursor of the matrix.

10. The composition of claim 1, wherein the composition is fired at a temperature below the melting temperature of the reinforcing additive.

11. The composition of claim 10, wherein the composition is fired at temperature between about 1200 and about 1350° C.

12. A method of preparing a proppant material comprising a ceramic matrix and a reinforcing additive, comprising the steps of crushing raw components, mixing raw components, granulation of the mixture into proppant granules, drying the granules, sintering the granules, and sieving the granules to provide selected sizes, wherein the reinforcing additive has a length of from greater than about 0.24 mm to less than about 4 mm, and wherein the reinforcing additive comprises wollastonite, wollastonite concentrate, or synthetic wollastonite crystals having a length to diameter ratio in the range of from about 3 to about 40, and wherein the ceramic matrix has an alumina content of from 60 percent to about 90 percent by weight.

13. The method of claim 12 wherein the raw components comprise one or more ceramic matrix precursor materials and the reinforcing additive.

14. The method of claim 12 wherein the raw components comprise one or more ceramic matrix precursor materials and one or more than one precursor of the reinforcing additive.

* * * * *